M. LICHTENSTEIN.
ANIMAL HEAD.
APPLICATION FILED AUG. 19, 1921.
1,432,704.
Patented Oct. 17, 1922.
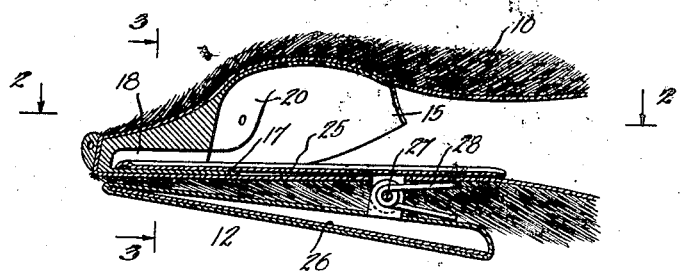
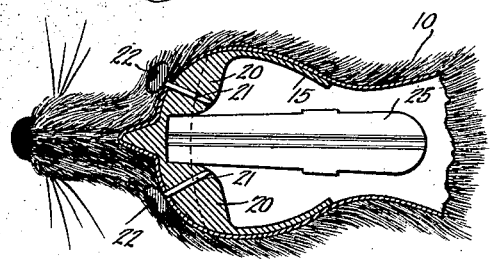
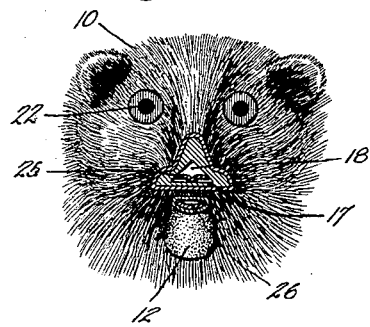
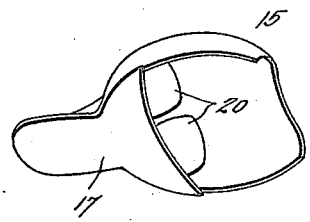
WITNESSES
INVENTOR
MARVIN LICHTENSTEIN,
BY
ATTORNEYS Patented Oct. 17, 1922.

1,432,704

UNITED STATES PATENT OFFICE.

MARVIN LICHTENSTEIN, OF NEW YORK, N. Y.

ANIMAL HEAD.

Application filed August 19, 1921. Serial No. 493,553.

*To all whom it may concern:*

Be it known that I, MARVIN LICHTENSTEIN, a citizen of the United States, and a resident of the city of New York, borough of Manhattan, in the county and State of New York, have invented a new and Improved Animal Head, of which the following is a full, clear, and exact description.

The invention relates to animal heads such as shown and described in the Letters Patent of the United States, No. 832,456, granted to Bernard Cohen on October 2, 1906.

The object of the present invention is to provide a new and improved animal head such as is used on fur scarfs, boas, fur neck pieces and other fur articles, and arranged to provide a strong and durable mouth clamp to securely clamp the jaws of the animal head in position on the tail-piece or other portion of the article.

Another object is to protect the skin at the under side of the upper jaw against wearing through on the repeated opening and closing of the jaws of the mouth clamp.

Another object is to permit of securely and quickly fastening the artificial eyes in place on the animal head.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a vertical sectional view of the improved animal head;

Figure 2 is a horizontal sectional view of the same on the line 2—2 of Figure 1;

Figure 3 is an enlarged cross-section of the same on the line 3—3 of Figure 1;

Figure 4 is a perspective view of the form over which the skin is fashioned; and Figure 5 is an underside perspective view of the same.

The improved animal head in its general construction comprises a fur skin 10, a form or a filling 11 of soft rubber or similar resilient material, and a clamping device 12 for removably attaching the animal head to the tail or other part of the fur neck scarf or other fur article on which the animal head is used. The form 11 comprises a hollow skull portion 15 open at the bottom and a snout portion 16 provided at the underside with an integral bottom 17 forming with the wall of the snout portion 16 a recess 18 open at the rear. The skull portion 15 is provided at the inner face at the eye portions with enlarged integral members or bosses 20 for receiving shanks 21 of the animal's eyes 22, the shanks 21 being forced through the fur skin 10 into the bosses 20 to securely hold the eyes 22 in position on the outer surface of the fur skin 10. It is understood that by forcing the shanks 21 of the eyes 22 into the resilient bosses 20, they are securely held in place by the soft rubber of which the bosses 20 are made.

The clamping device 12 comprises upper and lower clamping members 25 and 26, preferably made of metal and pivotally connected with each other by a transverse pivot 27. The clamping members 25 and 26 are normally held in a closed position at their forward ends by a spring 28. The upper clamping member 25 extends with its forward end into the recess 18 and the lower clamping member 26 is preferably covered with a piece of fur, velvet, or other suitable material. It will be noticed that the fur skin 10 is stretched across the underside of the bottom 17 and, hence, the upper member 25 of the clamping device 12 is not in direct contact with this portion of the fur skin, but is in engagement with the bottom 17 of the snout portion 16. It will also be noticed that the lower clamping member 26 when in normally closed position presses against the portion of the skin stretched over the bottom 17, and as the latter is of a soft material, the lower clamping member 26 is not liable to injure the fur skin stretched over the bottom 17. By having the recess 18 open at the rear and constituting a rearwardly directed scabbard the upper clamping member 25 can be readily inserted in the form 11 and further fastening means except the clamping quality of the clamping device is not required for holding the clamping device in place on the animal head.

In the U. S. patent to B. Cohen above referred to, the eyes are provided with wire shanks forced through the thin wall of the rubber skull and having their ends twisted together at the inside of the skull. This fastening of the eyes to the skull has proved very unsatisfactory, particularly as the wires are liable to cut the thin wall of the skull and hence become loose, and likewise the eyes, besides damaging the skull. By providing the integral bosses at the inside of the skull and forcing the wire shanks into the same the eyes are securely held in place and the skull is not injured.

Having thus described my invention, I claim as new and desire to secure by Letters Patent:

1. An animal head comprising a fur-skin head, a unitary form of resilient material over which such head-skin is fashioned, and a spring clasp having upper and lower members, said form comprising a skull including a snout portion closed at the bottom and formed with a recess open at the rear for the endwise adjustment therein of the upper member of the clasp to position the lower member to abut against the skin below the snout, said recess being shaped like a rearwardly extending scabbard to receive and position said upper clasp member and simultaneously to interpose a wall of such scabbard as a resilient buffer directly below the under surface of the upper member to protect the skin against damage where oppositely pressed by the two clasp members.

2. In an animal head, a form for the head of a fur skin and comprising a skull including an integral snout and made of a resilient material over which the skin is fashioned, the inside of the skull at the eye portions thereof being provided with integral bosses, and artificial eyes having attaching shanks forced through the fur skin and the wall of the skull into the said bosses to hold the eyes in place.

3. In an animal head, a skull made of soft rubber and including an integral snout provided with an integral bottom forming with the wall of the snout a recess open at the rear, the said skull being provided at the back of the eye portions with integral bosses, a head of a fur skin fashioned over the said skull and snout and having a portion of its skin in contact with the said bottom, artificial eyes having attaching shanks formed of pieces of wire forced through the fur skin and the wall of the skull into the said bosses, and a spring clamp having spring-pressed pivoted upper and lower members, of which the forward end of the upper member fits into the said recess and the lower member forms the lower jaw of the animal head and is adapted to abut against the skin extending under the said bottom.

MARVIN LICHTENSTEIN.